(12) United States Patent  
Bifulco (10) Patent No.: US 10,330,009 B2  
(45) Date of Patent: Jun. 25, 2019

(54) LOCK FOR THREADED IN PLACE NOSECONE OR SPINNER

(71) Applicant: UNITED TECHNOLOGIES CORPORATION, Farmington, CT (US)

(72) Inventor: Anthony R. Bifulco, Ellington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 297 days.

(21) Appl. No.: 15/406,353

(22) Filed: Jan. 13, 2017

(65) Prior Publication Data

US 2018/0202359 A1     Jul. 19, 2018

(51) Int. Cl.
*F02C 7/04*     (2006.01)
*F01D 25/24*     (2006.01)
(Continued)

(52) U.S. Cl.
CPC ................ *F02C 7/04* (2013.01); *B64C 11/14* (2013.01); *F01D 5/066* (2013.01); *F01D 25/24* (2013.01);
(Continued)

(58) Field of Classification Search
CPC . F02C 7/04; F01D 5/066; F01D 25/24; F01D 25/243; F01D 25/246; F01D 25/28;
(Continued)

(56) References Cited

U.S. PATENT DOCUMENTS

| | | | | |
|---|---|---|---|---|
| 913,201 A | * | 2/1909 | Coleman | F16B 39/32 411/331 |
| 1,011,871 A | * | 12/1911 | Smoke | F16B 39/32 411/331 |

(Continued)

FOREIGN PATENT DOCUMENTS

| | | |
|---|---|---|
| EP | 2216511 | 8/2010 |
| EP | 3088684 | 11/2016 |

(Continued)

OTHER PUBLICATIONS

Gandini, "Retaining Rings," https://www.gandini.it/www/anelliarresto/index.cfm?fuseaction=1st&languageid=gb&idsottocat_articoli=A&idcat_articoli=8; accessed Jan. 29, 2019. (Year: 2015).*

(Continued)

*Primary Examiner* — Hung Q Nguyen
*Assistant Examiner* — Mark L. Greene
(74) *Attorney, Agent, or Firm* — Snell & Wilmer, L.L.P.

(57) ABSTRACT

A lock for securing a nosecone having first threading to an inlet case having second threading and for use with a gas turbine engine having an axis includes an annular ring designed to be positioned about the first threading. The lock also includes a tab extending radially from the annular ring, and having a ramped circumferential end and an angled circumferential end such that the ramped circumferential end passes over a detent of the inlet case in response to the nosecone being fastened to the inlet case and the angled circumferential end engages with the detent to resist unfastening of the nosecone from the inlet case.

19 Claims, 6 Drawing Sheets

(51) Int. Cl.
*B64C 11/14* (2006.01)
*F01D 5/06* (2006.01)

(52) U.S. Cl.
CPC ...... *F05D 2220/32* (2013.01); *F05D 2220/36* (2013.01); *F05D 2260/30* (2013.01); *F05D 2260/33* (2013.01); *F05D 2260/36* (2013.01)

(58) Field of Classification Search
CPC ............. F05D 2220/32; F05D 2220/36; F05D 2260/30; F05D 2260/33; F05D 2260/36; B64C 11/14; F16B 39/32; Y10S 411/927; Y10S 411/94; Y10S 411/945; Y10S 411/946
USPC .......................... 411/199, 200, 315, 316, 317
See application file for complete search history.

(56) References Cited

U.S. PATENT DOCUMENTS

| | | | |
|---|---|---|---|
| 3,990,814 | A | 11/1976 | Leone |
| 5,344,284 | A | 9/1994 | Delvaux |
| 7,278,208 | B2 * | 10/2007 | Le Saint ................. B23P 6/002 29/402.02 |
| 2018/0171932 | A1 * | 6/2018 | De Sousa ............. F01D 25/162 |

FOREIGN PATENT DOCUMENTS

| | | |
|---|---|---|
| GB | 2169962 | 7/1986 |
| GB | 2344140 | 5/2000 |
| GB | 2363170 | 12/2001 |
| GB | 2459366 | 10/2009 |

OTHER PUBLICATIONS

U.S. Appl. No. 15/406,318, filed Jan. 13, 2017 and entitled JEM Stator Outer Platform Sealing and Retainer.
European Patent Office, European Search Report dated May 17, 2018 in Application No. 18151122.1-1006.
European Patent Office, European Search Report dated May 17, 2018 in Application No. 18150101.6-1006.
USPTO, Restriction/Election Requirement dated Dec. 21, 2018 in U.S. Appl. No. 15/406,318.

* cited by examiner

LOCK FOR THREADED IN PLACE NOSECONE OR SPINNER

FIELD

The present disclosure is directed to a reusable lock for securing a threaded connection between a nosecone and a corresponding inlet case of a gas turbine engine.

BACKGROUND

Many gas turbine engines include a nosecone positioned at an axially forward end of the gas turbine engine. Gas turbine engines also include an inlet case positioned axially aft of the nosecone. The nosecone directs air into the inlet case, where the air is received by a fan or a compressor section depending on the type of gas turbine engine in use.

Occasionally, it is desirable to disconnect the nosecone from the inlet case for various reasons such as maintenance. Some nosecones connect to corresponding inlet cases via threading. Conventional systems utilize a single-use lock to reduce the likelihood of the nosecone undesirably disconnecting from the inlet case during use of the gas turbine engine. One of the undesirable results of such a single-use lock is that a the lock is replaced with a new lock each time the nosecone is disconnected from the inlet case.

SUMMARY

Disclosed herein is a lock for securing a nosecone having first threading to an inlet case having second threading and for use with a gas turbine engine having an axis. The lock includes an annular ring designed to be positioned about the first threading. The lock also includes a tab extending radially from the annular ring, and having a ramped circumferential end and an angled circumferential end such that the ramped circumferential end passes over a detent of the inlet case in response to the nosecone being fastened to the inlet case and the angled circumferential end engages with the detent to resist unfastening of the nosecone from the inlet case.

In any of the foregoing embodiments, the lock is designed to be used with a stationary nosecone that does not rotate relative to the axis or a rotating nosecone that rotates about the axis.

In any of the foregoing embodiments, the angled circumferential end of the tab is designed to be disengaged from the detent such that the nosecone can be unfastened by applying an axially forward force to the tab.

In any of the foregoing embodiments, the angled circumferential end of the tab is designed to be disengaged from the detent such that the nosecone can be unfastened by applying a radially inward force to the tab.

In any of the foregoing embodiments, the annular ring and the tab include at least one of aluminum, titanium, or steel.

Any of the foregoing embodiments may also include a protrusion extending at least one of radially outward or radially inward and designed to be received by a pocket of the nosecone to resist rotation of the lock relative to the nosecone.

In any of the foregoing embodiments, the first threading is designed to be received by the second threading and the tab extends radially outward from the annular ring.

Any of the foregoing embodiments may also include a circumferential gap and wherein the tab is positioned circumferentially adjacent the circumferential gap.

In any of the foregoing embodiments, the tab is designed to return to an original position in response to the nosecone being separated from the inlet case.

In any of the foregoing embodiments, the tab further includes a first tab portion having the ramped circumferential end, a second tab portion having the angled circumferential end, and a space positioned circumferentially between the first tab portion and the second tab portion.

Also disclosed is a nosecone designed for use with an inlet case having second threading of a gas turbine engine having an axis. The nosecone includes a cone portion having first threading designed to mate with the second threading to couple the cone portion to the inlet case. The nosecone also includes a lock. The lock includes an annular ring designed to be positioned about the first threading. The lock also includes a tab extending radially from the annular ring, and having a ramped circumferential end and an angled circumferential end such that the ramped circumferential end passes over a detent of the inlet case in response to the cone portion being fastened to the inlet case and the angled circumferential end engages with the detent to resist unfastening of the cone portion from the inlet case.

In any of the foregoing embodiments, the angled circumferential end of the tab is designed to be disengaged from the detent such that the cone portion can be unfastened by applying an axially forward force to the tab.

In any of the foregoing embodiments, the angled circumferential end of the tab is designed to be disengaged from the detent such that the cone portion can be unfastened by applying a radially inward force to the tab.

In any of the foregoing embodiments, the lock further includes a protrusion extending at least one of radially outward or radially inward from the annular ring and designed to be received by a pocket of the cone portion to resist rotation of the lock relative to the cone portion.

In any of the foregoing embodiments, the tab is designed to return to an original position in response to the cone portion being separated from the inlet case.

In any of the foregoing embodiments, the tab further includes a first tab portion having the ramped circumferential end, a second tab portion having the angled circumferential end, and a space positioned circumferentially between the first tab portion and the second tab portion.

Also disclosed is a gas turbine engine having an axis. The gas turbine engine includes an inlet case having second threading. The gas turbine engine also includes a cone portion having first threading designed to mate with the second threading to couple the cone portion to the inlet case. The gas turbine engine also includes a lock. The lock includes an annular ring designed to be positioned about the first threading. The lock also includes a tab extending radially from the annular ring, and having a ramped circumferential end and an angled circumferential end such that the ramped circumferential end passes over a detent of the inlet case in response to the cone portion being fastened to the inlet case and the angled circumferential end engages with the detent to resist unfastening of the cone portion from the inlet case.

In any of the foregoing embodiments, the angled circumferential end of the tab is designed to be disengaged from the detent such that the cone portion can be unfastened by applying an axially forward force to the tab.

In any of the foregoing embodiments, the angled circumferential end of the tab is designed to be disengaged from the detent such that the cone portion can be unfastened by applying a radially inward force to the tab.

In any of the foregoing embodiments, the tab is designed to return to an original position in response to the cone portion being separated from the inlet case.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed, non-limiting, embodiments. The drawings that accompany the detailed description can be briefly described as follows.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

As used herein, "radially outward" refers to the direction generally away from the axis of rotation of a turbine engine. As used herein, "radially inward" refers to the direction generally towards the axis of rotation of a turbine engine.

Figure 1:
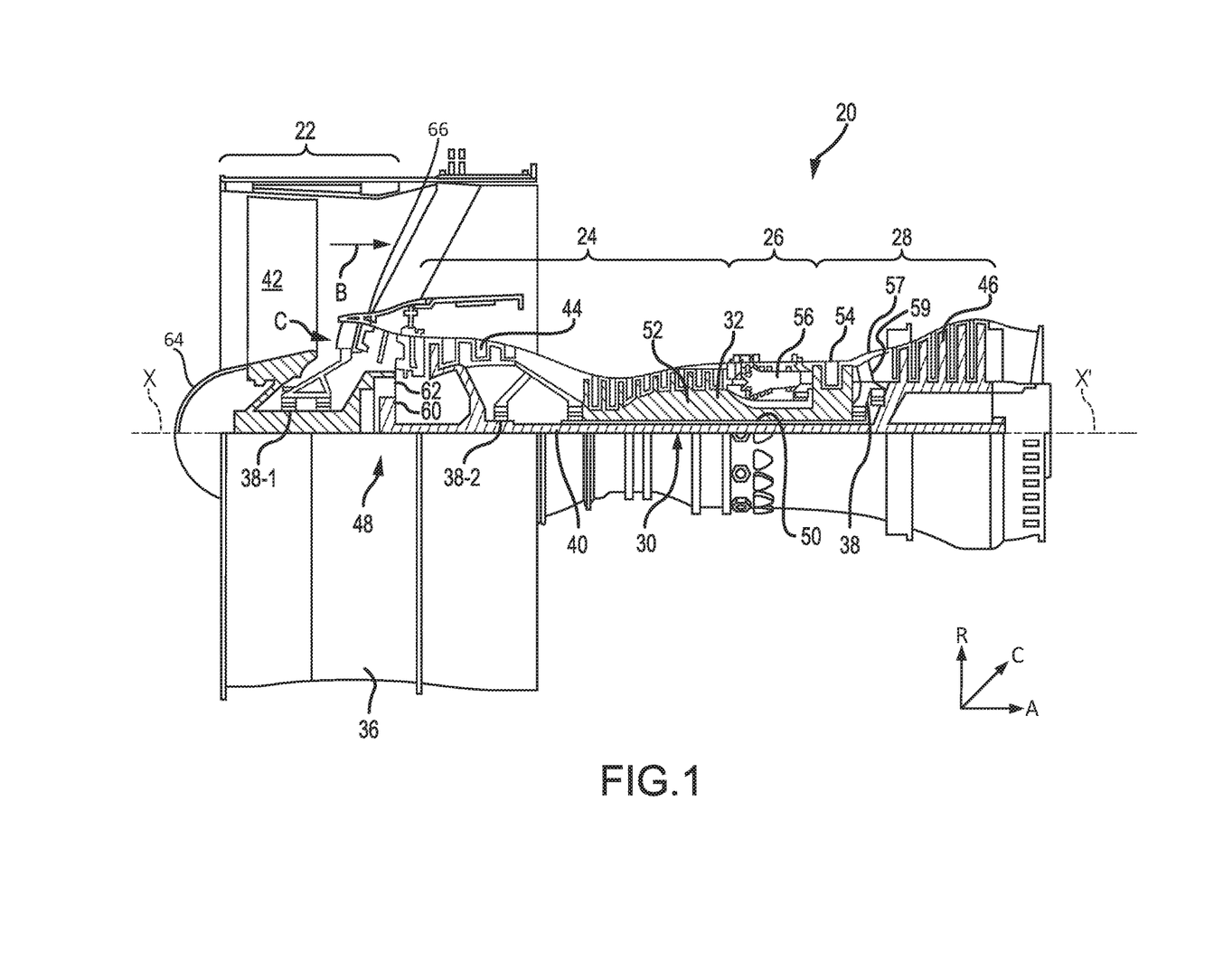
FIG. 1 is a schematic cross-section of a gas turbine engine, in accordance with various embodiments.

In various embodiments and with reference to FIG. 1, a gas turbine engine 20 is provided. The gas turbine engine 20 may be a two-spool turbofan that generally incorporates a fan section 22, a compressor section 24, a combustor section 26 and a turbine section 28. Alternative engines may include, for example, an augmentor section among other systems or features. In operation, the fan section 22 can drive coolant (e.g., air) along a bypass flow path B while the compressor section 24 can drive coolant along a core flow path C for compression and communication into the combustor section 26 then expansion through the turbine section 28. Although depicted as a turbofan gas turbine engine 20 herein, it should be understood that the concepts described herein are not limited to use with turbofans as the teachings may be applied to other types of turbine engines including three-spool architectures.

The gas turbine engine 20 may generally comprise a low speed spool 30 and a high speed spool 32 mounted for rotation about an engine central longitudinal axis X-X' relative to an engine static structure 36 or engine case via several bearing systems 38, 38-1, and 38-2. An A-R-C axis is shown throughout the drawings to illustrate the axial, radial, and circumferential directions relative to the central longitudinal axis X-X'. It should be understood that various bearing systems 38 at various locations may alternatively or additionally be provided, including for example, the bearing system 38, the bearing system 38-1, and the bearing system 38-2.

The low speed spool 30 may generally comprise an inner shaft 40 that interconnects a fan 42, a low pressure compressor 44 and a low pressure turbine 46. The inner shaft 40 may be connected to the fan 42 through a geared architecture 48 that can drive the fan 42 at a lower speed than the low speed spool 30. The geared architecture 48 may comprise a gear assembly 60 enclosed within a gear housing 62. The gear assembly 60 couples the inner shaft 40 to a rotating fan structure. The high speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of the engine static structure 36 may be located generally between the high pressure turbine 54 and the low pressure turbine 46. Mid-turbine frame 57 may support one or more bearing systems 38 in the turbine section 28. The inner shaft 40 and the outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The airflow of core flow path C may be compressed by the low pressure compressor 44 then the high pressure compressor 52, mixed and burned with fuel in the combustor 56, then expanded over the high pressure turbine 54 and the low pressure turbine 46. The turbines 46, 54 rotationally drive the respective low speed spool 30 and high speed spool 32 in response to the expansion.

The gas turbine engine 20 may be, for example, a high-bypass ratio geared engine. In various embodiments, the bypass ratio of the gas turbine engine 20 may be greater than about six (6). In various embodiments, the bypass ratio of the gas turbine engine 20 may be greater than ten (10). In various embodiments, the geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). In various embodiments, the bypass ratio of the gas turbine engine 20 is greater than about ten (10:1). In various embodiments, the diameter of the fan 42 may be significantly larger than that of the low pressure compressor 44, and the low pressure turbine 46 may have a pressure ratio that is greater than about five (5:1). The low pressure turbine 46 pressure ratio may be measured prior to the inlet of the low pressure turbine 46 as related to the pressure at the outlet of the low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared engine, such as a geared turbofan, or non-geared engine, such as a turbofan, a turboshaft, or may comprise any gas turbine engine as desired.

In various embodiments, the low pressure compressor 44, the high pressure compressor 52, the low pressure turbine 46, and the high pressure turbine 54 may comprise one or more stages or sets of rotating blades and one or more stages or sets of stationary vanes axially interspersed with the associated blade stages but non-rotating about engine central longitudinal axis A-A'. The compressor and turbine sections 24, 28 may be referred to as rotor systems. Within the rotor systems of the gas turbine engine 20 are multiple rotor disks, which may include one or more cover plates or minidisks. Minidisks may be configured to receive balancing weights or inserts for balancing the rotor systems.

Referring to FIGS. 1, 2A, 2B, and 2C, the gas turbine engine 20 may include a nosecone 64 and an inlet case 66. The nosecone 64 may direct airflow into the inlet case 66, where it may be received by the compressor section 24. In various embodiments, the airflow received by the inlet case 66 may then be received by the fan section 22. In various embodiments, the nosecone 64 may be stationary relative to the inlet case 66 and, in various embodiments, the nosecone 64 may rotate about the axis X-X' relative to the inlet case 66 (in that regard, the nosecone 64 may be referred to as a spinner).

Figure 2A:
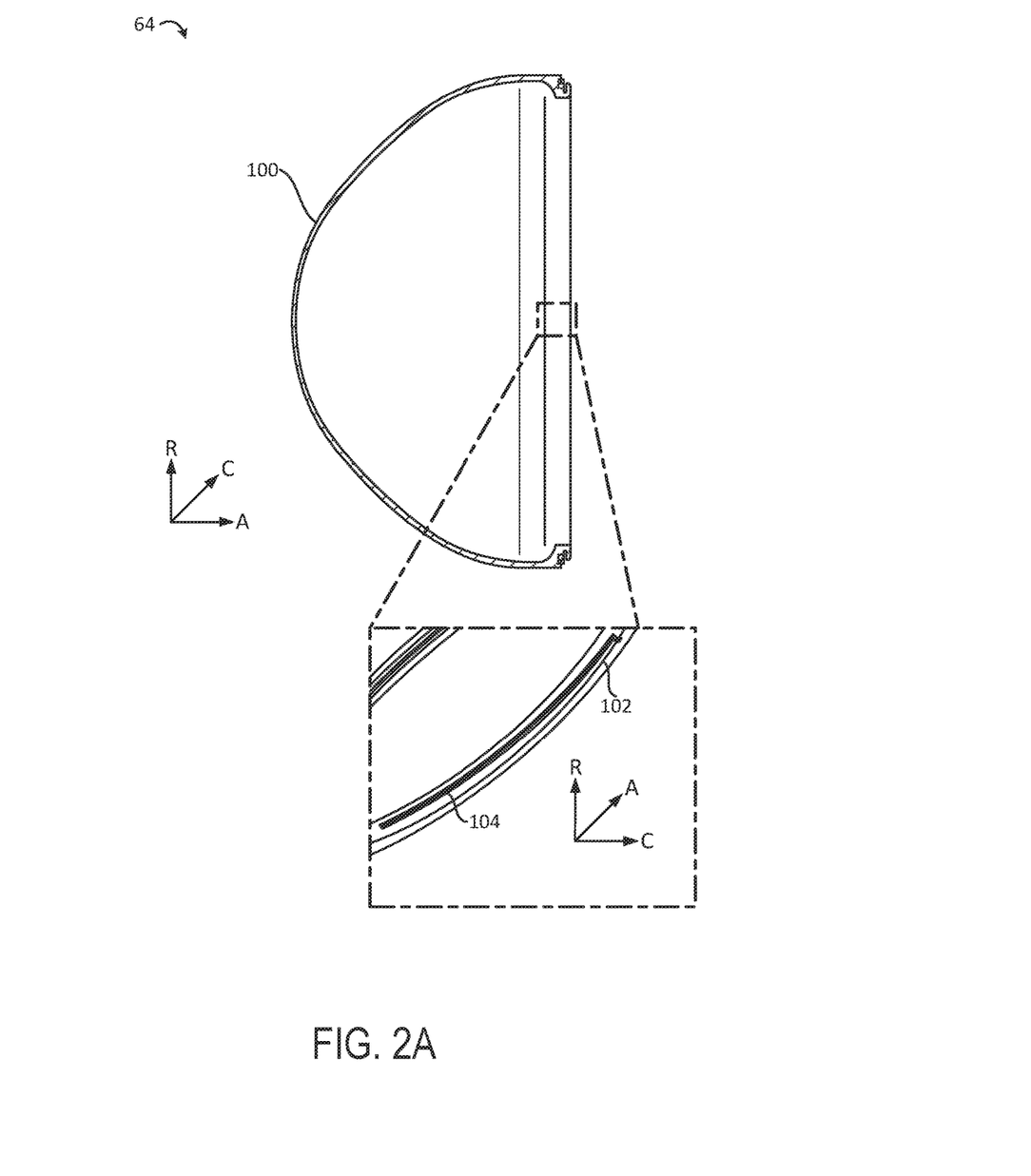
FIG. 2A is a cross-sectional view of a nosecone of the gas turbine engine of FIG. 1, in accordance with various embodiments.
Figure 2B:
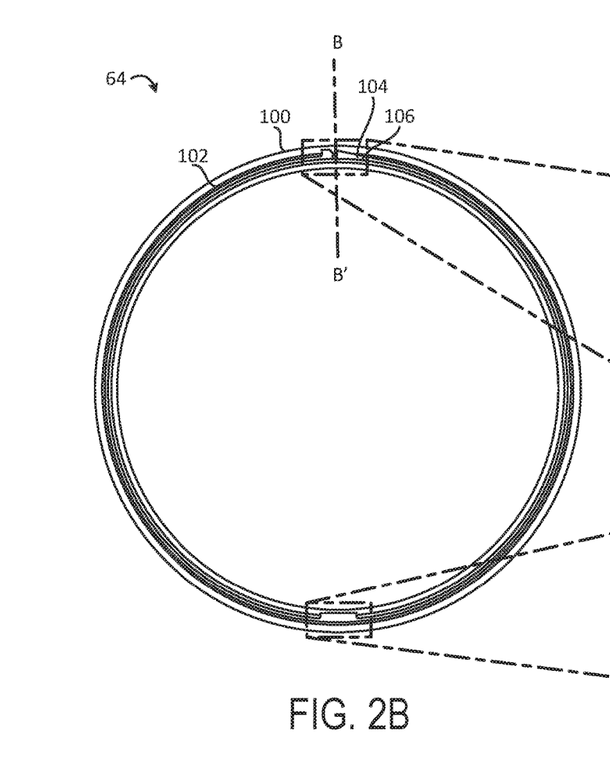
FIG. 2B is an axial view of the nosecone of FIG. 2A illustrating a lock usable to resist separation of the nosecone relative to an inlet case, in accordance with various embodiments.
Figure 2C:
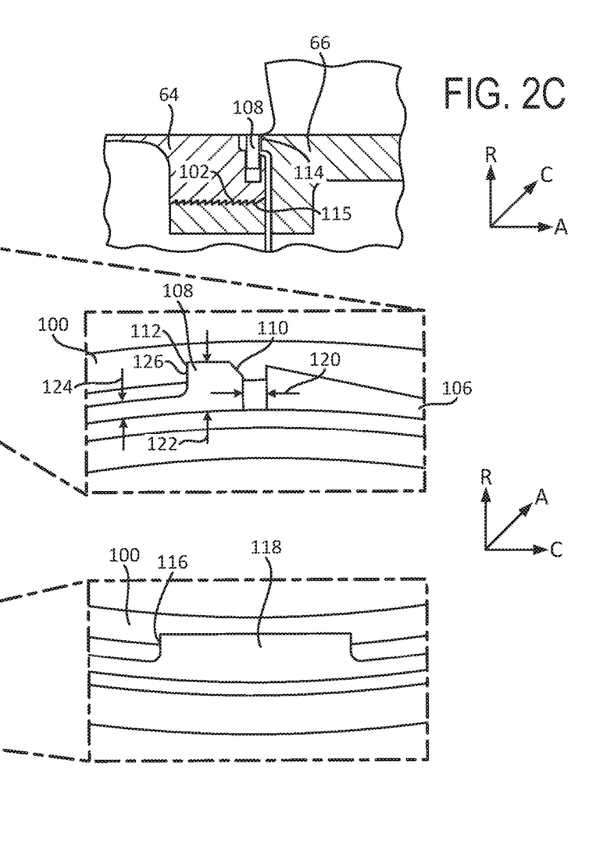
FIG. 2C is an enlarged cross-sectional view of the nosecone and lock of FIG. 2B coupled to an inlet case and taken along the line B-B' of FIG. 2B, in accordance with various embodiments.

In various embodiments, the nosecone 64 may include a cone portion 100 that has a conical shape. The cone portion 100 receives the air and directs the air to the fan section 22 or the compressor section 24. The nosecone 64 is designed to be coupled to the inlet case 66. In that regard, the nosecone 64 includes first threading 102 that interfaces with and fastens to second threading 115 of the inlet case 66.

It is desirable for the first threading 102 of the nosecone 64 to remain coupled to the second threading 115 of the inlet case 66 in response to operation of the gas turbine engine 20. Stated differently, it is undesirable for the $1^{st}$ threading 102 of the nosecone 64 rotate relative to the $2^{nd}$ threading 115 during use of the gas turbine engine 20. In that regard, a lock 104 may be used in conjunction with the nosecone 64 to reduce the likelihood of rotation of the nosecone 64 relative to the inlet case 66.

The lock 104 may include an annular ring 106 that is positioned about the first threading 102. The cone portion 100 of the nosecone 64 may define a pocket 116 that is positioned adjacent to the first threading 102. The pocket 116 may be positioned radially inward from the first threading 102. The lock 104 may also include a protrusion 118 extending radially inward from the annular ring 106. The annular ring 106 may be positioned about the first threading 102 such that the protrusion 118 is received by the pocket 116. In that regard, the annular ring 106 may resist rotation relative to the first threading 102 due to the interface between the protrusion 118 and the pocket 116.

The lock 104 may further include a circumferential gap 120 and a tab 108. The tab 108 may be positioned circumferentially adjacent to the circumferential gap 120. The circumferential gap 120 may facilitate enlargement of the annular ring 106 such that the annular ring 106 may be positioned about the $1^{st}$ threading 102.

The tab 108 may include a ramped circumferential end 110 and an angled circumferential end 112. The tab 108 may have a thickness 122 that is greater than a thickness 124 of the remainder of the annular ring 106. The ramped circumferential end 110 may be tapered towards the thickness 122, and the angled circumferential end 112 may not have a taper such that a circumferential edge 126 is formed.

As the nosecone 64 is screwed onto the inlet case 66, the ramped circumferential end 110 reaches one or more detent 114 of the inlet case 66. The taper of the ramped circumferential end 110 allows the tab 108 to pass over the one or more detent 114 of the inlet case 66.

In response to the nosecone 64 being coupled to the inlet case 66, the tab 108 may be positioned within the detent 114. The angled circumferential end 112 of the tab 108 (i.e., the circumferential edge 126) may be positioned adjacent one or more sides of the detent 114, resisting rotation of the lock 104, and thus the cone portion 100, relative to the inlet case 66.

In order to decouple the nosecone 64 from the inlet case 66, it is desirable for the tab 108 to be removed from the detent 114. In order to remove the tab 108 from the detent 114, the tab may be actuated radially inward relative to the detent 114. In response to the tab 108 being removed from the detent 114, the cone portion 100 may be rotated relative to the inlet case 66 to separate the cone portion 100 from the inlet case 66. In various embodiments, the tab 108 may be actuated and held radially inward relative to the detent 114 while the cone portion 100 is rotated relative to the inlet case 66.

In various embodiments, a lock and an inlet case may be designed such that a tab may be actuated radially outward relative to a detent to separate the tab from the detent.

In various embodiments, the lock 104 may include a metal. For example, the lock 104 (including the annular ring 106, the protrusion 118, and the tab 108) may include one or more of an aluminum or aluminum alloy, a titanium or titanium alloy, a steel alloy, or the like.

The tab 108 may return to its original position after being actuated radially inward. In that regard, the lock 104 may be used multiple times. This is advantageous over conventional locks as conventional locks may be considered a single use part such that a new lock is used each time the nosecone is separated from the inlet case. In particular, the lock 104 may deform in response to use but the deformation may be elastic. In that regard, the lock 104 may return to its original shape after use such that it may be reused. Conventional locks, however, may plastically deform in response to use such that the conventional lock may not return to its original shape after use. Thus, conventional locks may necessitate replacement after a single use.

Figure 3A:
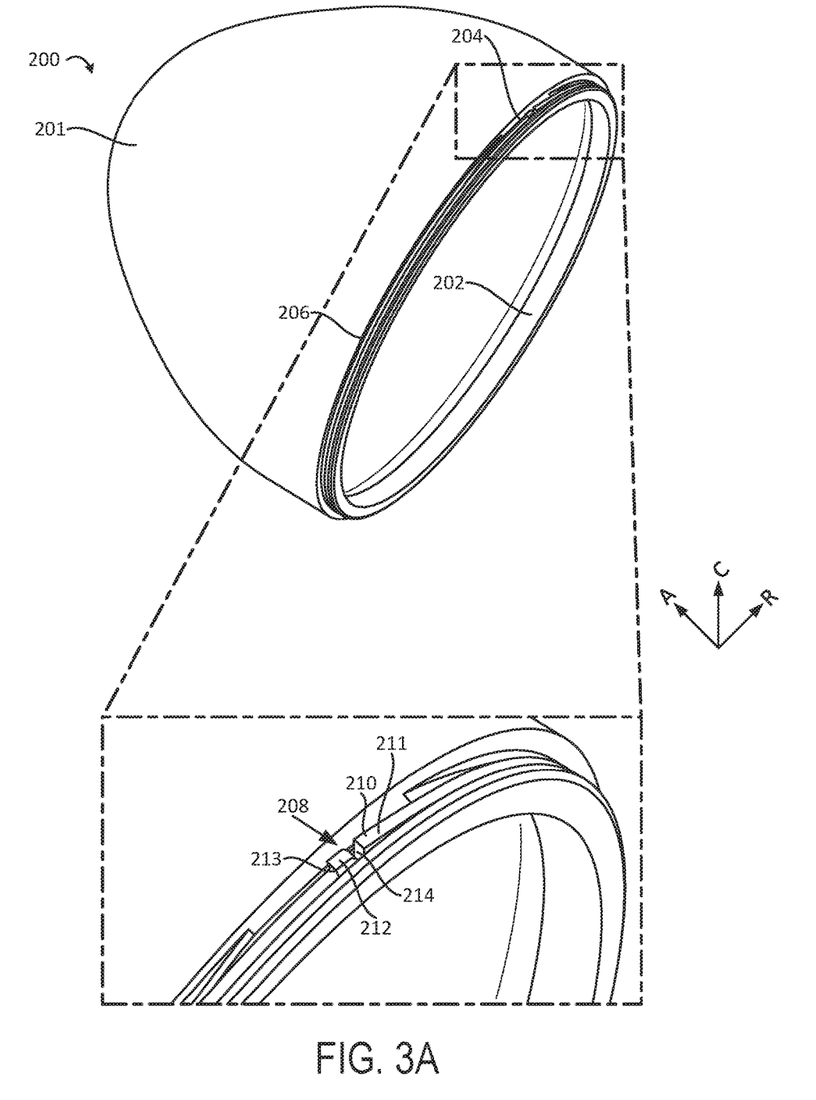
FIG. 3A is a perspective view of a nosecone of a gas turbine engine including a lock for resisting separation of the nosecone relative to an inlet case, in accordance with various embodiments.
Figure 3B:
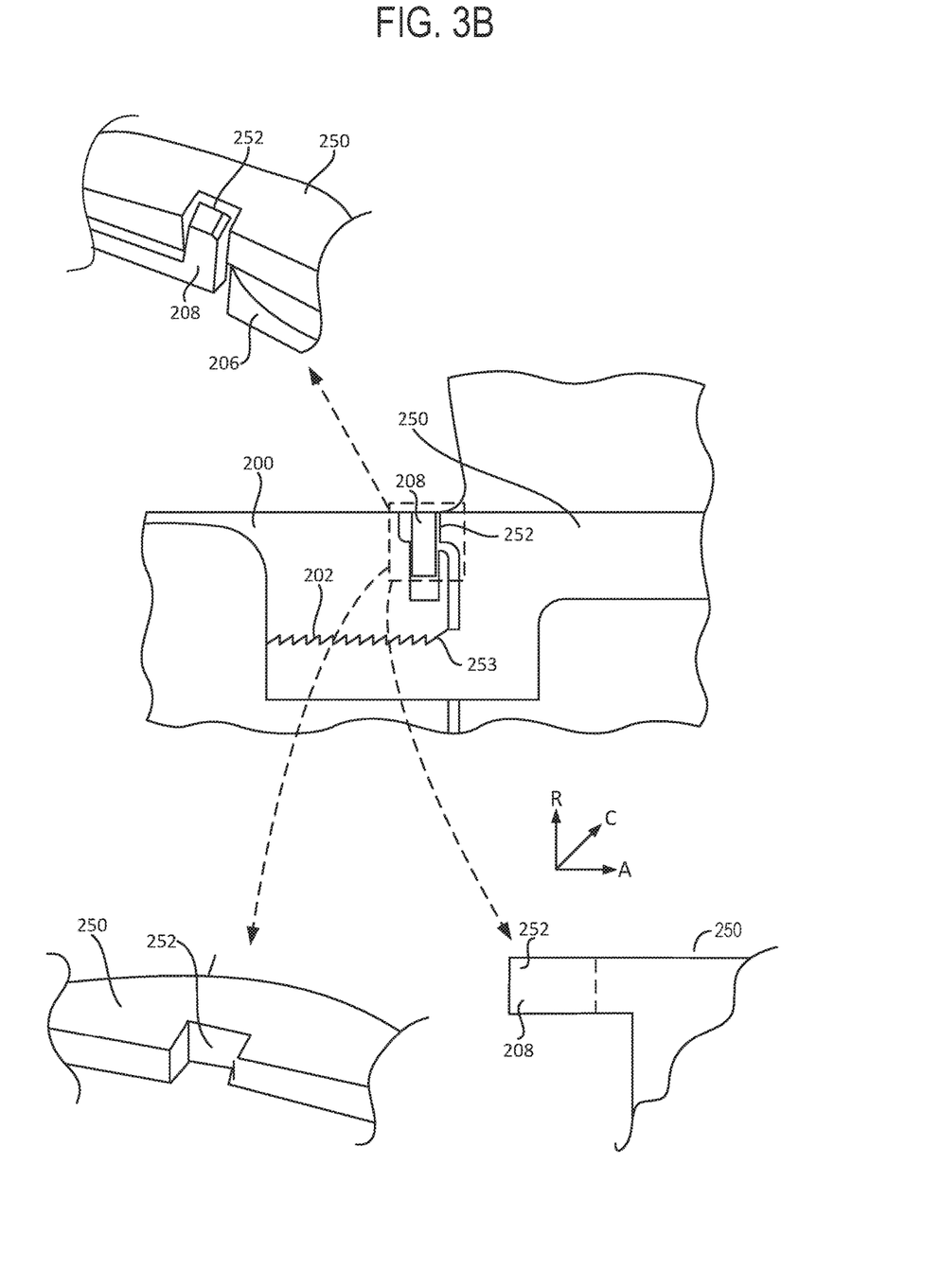
FIG. 3B is an enlarged cross-sectional view of the nosecone and lock of FIG. 3A coupled to an inlet case, in accordance with various embodiments.

Referring now to FIGS. 3A and 3B, another nosecone 200 may be designed to be coupled to an inlet case 250. The nosecone 200 includes a cone portion 201 and first threading 202. The inlet case 250 includes a second threading 253 designed to be coupled to the first threading 202 of the nosecone 200.

A lock 204, similar to the lock 104 of FIG. 2B, may be used to reduce the likelihood of separation of the nosecone 200 relative to the inlet case 250. The lock 204 includes an annular ring 206 and a tab 208. The tab includes a first tab portion 210 and a second tab portion 212. The first tab portion 210 includes a ramped circumferential end 211 and the second tab portion 212 includes an angled circumferential end 213. A space 214 may be present between the first tab portion 210 and the second tab portion 212.

The annular ring 206 is designed to be positioned about the first threading 202. As the cone portion 201 is fastened to the inlet case 250, the ramped circumferential end 211 of the lock 204 may pass over one or more detent 252 of the inlet case 250. The ramped circumferential end 211 may pass over the detent 252 due to the taper of the ramped circumferential end 211.

In response to the nosecone 200 being fastened to the inlet case 250, the tab 208 (including one or more of the first tab portion 210 or the second tab portion 212) may be positioned within the detent 252. The angled circumferential end 213 may be positioned adjacent an edge of the detent 252. In that regard, the angled circumferential end 213 may resist rotation of the lock 204 (and thus the cone portion 201) relative to the inlet case 250 due to the lack of taper of the angled circumferential end 213.

In order to decouple the nosecone 200 from the inlet case 250, the tab 208 may be actuated relative to the detent 252. In particular, the tab 208 may be actuated axially relative to the detent 252. For example, the tab 208 may be actuated axially forward or axially aft relative to the detent 252. The cone portion 201 may be rotated relative to the inlet case 250 while the tab 208 is actuated away from the detent 252 in order to separate the cone portion 201 from the inlet case 250.

Figure 4:
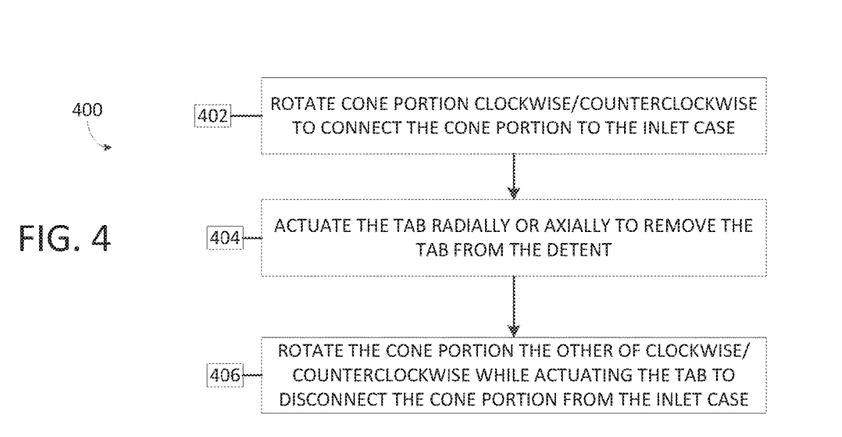
FIG. 4 is a flowchart illustrating a method for connecting and disconnecting a nosecone to an inlet case using a lock, in accordance with various embodiments.

Turning to FIG. 4, a method 400 for connecting and disconnecting a nosecone having a lock from an inlet case is shown. In block 402, the cone portion may be positioned adjacent the inlet case such that the threading of each aligns. The cone portion may then be rotated either clockwise or counterclockwise relative to the inlet case to engage the threadings. As the cone portion is screwed onto the inlet case, the ramped circumferential end of the tab passes detents. In response to the cone portion being fastened to the inlet case, the tab may be positioned in a detent such that the angled circumferential end resists rotation of the cone portion in the other of the clockwise or counterclockwise direction.

In block 404, to remove the cone portion, the tab may be actuated either radially or axially, depending upon the design of the lock. In block 406, the cone portion may be rotated in the other of clockwise or counterclockwise while the tab is actuated in the disengaged position. Such rotation will disengage (i.e., unscrew) the cone portion from the inlet case.

While the disclosure is described with reference to exemplary embodiments, it will be understood by those skilled in the art that various changes may be made and equivalents may be substituted without departing from the spirit and scope of the disclosure. In addition, different modifications may be made to adapt the teachings of the disclosure to particular situations or materials, without departing from the essential scope thereof. The disclosure is thus not limited to the particular examples disclosed herein, but includes all embodiments falling within the scope of the appended claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of a, b, or c" is used in the claims, it is intended that the phrase be interpreted to mean that a alone may be present in an embodiment, b alone may be present in an embodiment, c alone may be present in an embodiment, or that any combination of the elements a, b and c may be present in a single embodiment; for example, a and b, a and c, b and c, or a and b and c. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of

The invention claimed is:

1. A lock for securing a nosecone having first threading to an inlet case having second threading of a gas turbine engine having an axis, comprising:
   an annular ring configured to be positioned about the first threading; and
   a tab extending radially from the annular ring, and having a ramped circumferential end and an angled circumferential end such that the ramped circumferential end passes over a detent of the inlet case in response to the nosecone being fastened to the inlet case and the angled circumferential end engages with the detent to resist unfastening of the nosecone from the inlet case;
   wherein the tab further includes a first tab portion having the ramped circumferential end, a second tab portion having the angled circumferential end, and a space positioned circumferentially between the first tab portion and the second tab portion;
   wherein the angled circumferential end of the tab is configured to be disengaged from the detent such that the nosecone can be unfastened by applying an axially forward force or a radially inward force to the tab.

2. The lock of claim 1, wherein the lock is configured to be used with a stationary nosecone that does not rotate relative to the axis or a rotating nosecone that rotates about the axis.

3. The lock of claim 1, wherein the angled circumferential end of the tab is configured to be disengaged from the detent such that the nosecone can be unfastened by applying the axially forward force to the tab.

4. The lock of claim 1, wherein the angled circumferential end of the tab is configured to be disengaged from the detent such that the nosecone can be unfastened by applying the radially inward force to the tab.

5. The lock of claim 1, wherein the annular ring and the tab include at least one of aluminum, titanium, or steel.

6. The lock of claim 1, further comprising a protrusion extending at least one of radially outward or radially inward and configured to be received by a pocket of the nosecone to resist rotation of the lock relative to the nosecone.

7. The lock of claim 1, wherein the first threading is configured to be received by the second threading and wherein the tab extends radially outward from the annular ring.

8. The lock of claim 1, further comprising a circumferential gap and wherein the tab is positioned circumferentially adjacent the circumferential gap.

9. The lock of claim 1, wherein the tab is configured to return to an original position in response to the nosecone being separated from the inlet case.

10. A nosecone configured for use with an inlet case having second threading of a gas turbine engine having an axis, comprising:
    a cone portion having first threading configured to mate with the second threading to couple the cone portion to the inlet case; and
    a lock having:
        an annular ring configured to be positioned about the first threading, and
        a tab extending radially from the annular ring, and having a ramped circumferential end and an angled circumferential end such that the ramped circumferential end passes over a detent of the inlet case in response to the cone portion being fastened to the inlet case and the angled circumferential end engages with the detent to resist unfastening of the cone portion from the inlet case.

11. The nosecone of claim 10, wherein the angled circumferential end of the tab is configured to be disengaged from the detent such that the cone portion can be unfastened by applying an axially forward force to the tab.

12. The nosecone of claim 10, wherein the angled circumferential end of the tab is configured to be disengaged from the detent such that the cone portion can be unfastened by applying a radially inward force to the tab.

13. The nosecone of claim 10, wherein the lock further includes a protrusion extending at least one of radially outward or radially inward from the annular ring and configured to be received by a pocket of the cone portion to resist rotation of the lock relative to the cone portion.

14. The nosecone of claim 10, wherein the tab is configured to return to an original position in response to the cone portion being separated from the inlet case.

15. The nosecone of claim 10, wherein the tab further includes a first tab portion having the ramped circumferential end, a second tab portion having the angled circumferential end, and a space positioned circumferentially between the first tab portion and the second tab portion.

16. A gas turbine engine having an axis, comprising:
    an inlet case having second threading;
    a cone portion having first threading configured to mate with the second threading to couple the cone portion to the inlet case; and
    a lock having:
        an annular ring configured to be positioned about the first threading, and
        a tab extending radially from the annular ring, and having a ramped circumferential end and an angled circumferential end such that the ramped circumferential end passes over a detent of the inlet case in response to the cone portion being fastened to the inlet case and the angled circumferential end engages with the detent to resist unfastening of the cone portion from the inlet case.

17. The gas turbine engine of claim 16, wherein the angled circumferential end of the tab is configured to be disengaged from the detent such that the cone portion can be unfastened by applying an axially forward force to the tab.

18. The gas turbine engine of claim 16, wherein the angled circumferential end of the tab is configured to be disengaged from the detent such that the cone portion can be unfastened by applying a radially inward force to the tab.

19. The gas turbine engine of claim 16, wherein the tab is configured to return to an original position in response to the cone portion being separated from the inlet case.

* * * * *